(12) United States Patent
Markstein et al.

(10) Patent No.: US 7,155,471 B2
(45) Date of Patent: Dec. 26, 2006

(54) METHOD AND SYSTEM FOR DETERMINING THE CORRECT ROUNDING OF A FUNCTION

(75) Inventors: Peter Markstein, Woodside, CA (US);
Dale Morris, Steamboat Springs, CO (US); James M. Hull, Saratoga, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 627 days.

(21) Appl. No.: 10/366,003

(22) Filed: Feb. 12, 2003

(65) Prior Publication Data

US 2004/0158600 A1   Aug. 12, 2004

(51) Int. Cl.
*G06F 7/38* (2006.01)
(52) U.S. Cl. .................................... 708/497
(58) Field of Classification Search ............... 708/497, 708/551
See application file for complete search history.

(56) References Cited

U.S. PATENT DOCUMENTS

| | | | |
|---|---|---|---|
| 6,427,160 B1 * | 7/2002 | Parks et al. | 708/530 |
| 6,889,242 B1 * | 5/2005 | Sijstermans et al. | 708/551 |
| 2001/0056453 A1 * | 12/2001 | Steele, Jr. | 708/497 |
| 2002/0087610 A1 * | 7/2002 | Pether et al. | 708/551 |

* cited by examiner

*Primary Examiner*—D. H Malzahn

(57) ABSTRACT

A method and system is used to determine the correct rounding of a floating point function. The method involves performing the floating point function to a higher precision than required and examining the portion of extra precision in the result known as the discriminant. If a critical pattern is found in the discriminant, this indicates that standard rounding may give an incorrect result and further calculation is needed. The method can work for various rounding modes and types of floating point representations. The method can be implemented in a system as part of a processor instruction set or any combination of hardware, microcode, and software.

12 Claims, 3 Drawing Sheets

METHOD AND SYSTEM FOR DETERMINING THE CORRECT ROUNDING OF A FUNCTION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present disclosure relates in general to computational methods, and in particular to floating point computations.

BACKGROUND

Other than simple arithmetic operations, it is difficult to correctly round a mathematical function using floating point numbers. The IEEE-754 standard is the most commonly adopted standard for representing and manipulating floating point numbers in computer hardware and software. The IEEE standard also describes the rounding of floating point operations. However, implementation of the standard does not guarantee the same rounding performance among different computing platforms in certain situations.

Each computing platform (architecture/operating system combination) has its own floating point libraries of mathematical functions. Implementations vary to accommodate the platform's capabilities. Since there is no standard for mathematical libraries, different results are often obtained when moving from one platform to another. These differences are typically small, but still can have a significant impact on the overall computed result in certain programs. If correct rounding could be achieved at almost no cost, it would be in the programming community's interest to have floating point library functions correctly rounded.

A solution that addresses the aforementioned problems, as well as other related problems, is therefore desirable.

SUMMARY

To overcome limitations in the prior art described above, and to overcome other limitations that will become apparent upon reading and understanding the present specification, a method and apparatus is disclosed for determining a potential rounding error in a floating point computation. The method involves executing a machine instruction to indicate whether the floating point computation may contain a rounding error. The machine instruction involves calculating a partial result of the floating point computation. The partial result includes a portion of extra precision defined as a discriminant. The discriminant is tested for a critical pattern. If the critical pattern is not found in the discriminant, the instruction can provide an indication of this. Absence of critical patterns means that the function is correctly rounded.

The instruction may be configured to indicate the critical pattern is present by setting a return value to indicate a successful rounding. In another embodiment, the instruction may branch or execute a software assist trap depending on the existence of the critical pattern in the discriminant.

The above summary of the present invention is not intended to describe each illustrated embodiment or implementation of the present invention. This is the purpose of the figures and the associated discussion that follows.

BRIEF DESCRIPTION OF THE DRAWINGS

The invention is described in connection with the embodiments illustrated in the following diagrams.

DETAILED DESCRIPTION

Figure 1:
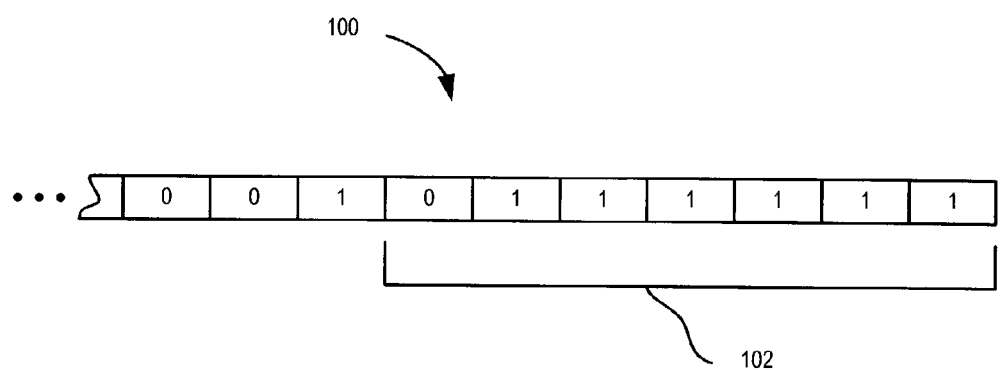
FIG. 1 is a portion of a binary floating point number showing a discriminant with a critical pattern in round-to-nearest mode.

In the following description of example embodiments, reference is made to the accompanying drawings that form a part hereof, and in which is shown by way of illustration various manners in which the invention may be practiced. It is to be understood that other embodiments may be utilized, as structural and operational changes may be made without departing from the scope of the present invention.

When dealing with representations of real numbers, digital computers rely on approximate representations such as fixed or floating point. Unlike integers, which can be exactly represented in binary for a given finite range and word length, floating point representations of real numbers are necessarily approximations. Floating point operations (e.g. arithmetic calculations) typically give an intermediate result having more bits than the width of the operands. Therefore, floating point operations in hardware and mathematical libraries usually require some sort of rounding.

A commonly used implementation of floating point numbers is detailed in the IEEE-754 Standard for floating point arithmetic. IEEE-754 not only defines bit patterns and word lengths of various floating point numbers (single, double, single-extended, double-extended), but also defines how floating point arithmetic is performed, including how rounding should occur. The IEEE standard defines four types of rounding: to nearest, +infinity, −infinity, and zero. The last three are also referred herein as "directed" rounding, since the rounding always occurs in one direction. Round-to-nearest is commonly used in typical floating point calculations, although the concepts of the present invention can be applied to any type of rounding.

In round-to-nearest mode, rounding is fairly straightforward. For example, if we consider rounding to three digits, 12.33 is rounded to 12.3 and 12.37 is rounded to 12.4. The only question when using round-to-nearest occurs where the last rounded digit is a 5, such as 12.35. Depending on the implementation, this can be rounded to 12.3 or 12.4. The IEEE-754 prescribes "round to even", wherein numbers exactly half way between two representable floating point numbers are rounded to the nearest representable neighbor whose last digit is even. So 12.45 would be rounded to 12.4, not 12.5, because 4 is even.

Usually, a function uses rounding where a partial result is computed to more precision than required. The final operations of such a function may combine partial results, often in the higher precision format. This higher precision result is then rounded to the target number format.

When the final operation calculates a higher precision partial result that is then rounded, the additional n positions of precision beyond the final rounded position are called the discriminant. If the computation of the function is designed to make an error smaller than 1 unit in the nth position beyond the rounding position (i.e. the low order discriminant position), then in most cases, computing to a wider precision and then rounding to the final precision delivers the correct rounding, but in a few cases it does not. The pattern of digits in the discriminant indicates whether correct rounding is certain.

In the example of rounding an intermediate result of 12.35 to 12.4, it may be that 12.35 represents 12.350000000 . . . , in which case rounding to 12.4 is correct. However, if a higher precision examination of the 12.35 result finds that this number is equal to 12.34999999 . . . , the correct rounding result should be 12.3. The pattern of the discriminant (in this case the 5 in 12.35) is an indicator that incorrect rounding may result without further examination.

Figure 2:
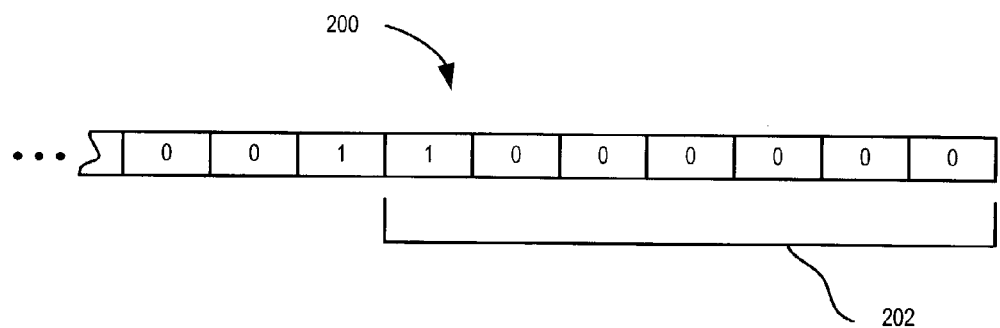
FIG. 2 is a is a portion of a binary floating point number showing a discriminant with a second critical pattern in round-to-nearest mode.

There are two patterns of digits that may signal a result may be incorrectly rounded for any given rounding mode. FIG. 1 illustrates one case for a binary number 100 in round-to-nearest mode. The binary number 100 is assumed to be an intermediate result of a floating point calculation. The last seven bits of this number will be rounded when returning the final result, therefore these seven bits form the discriminant 102. The discriminant 102 contains a critical pattern that indicates incorrect rounding may result. FIG. 2 illustrates another binary number 200 similar to number 100 that has a different critical pattern in the discriminant 202. The critical patterns in both discriminants 102, 202 assume the rounding mode is round-to-nearest.

In general, an n-bit wide binary discriminant contains the critical pattern if it consists of a 0 followed by n–1 1's or a 1 followed by n–1 0's. If we set n=7, it can be seen that discriminants 101 and 202, respectively, follow the two critical patterns just described. In directed rounding, the critical patterns would be n 0's or n 1's.

Although the invention is described in terms of a binary radix, it is appreciated that concepts according to the present invention are applicable to any number system. For example, using a decimal radix, the critical patterns are 4 followed by n–1 9's or a 5 followed by n–1 0's in round-to-nearest mode. With directed rounding, the critical patterns would be n 0's or n 9's.

In cases where the critical pattern is not found in the discriminant, the number can be rounded as appropriate, and the routine is finished. However, if the critical pattern is found in the discriminant, further steps must be taken. The further steps involve recomputing the calculation to a much wider precision to resolve the rounding decision.

Turning back to FIGS. 1 and 2, it can be appreciated that the results of rounding may differ depending on what a higher precision calculation would show in the discriminant. If round-to-nearest was used for the 7-bit discriminant 1000000, the number would be rounded up, although it could not be assumed that this rounding decision was correct. However, if a higher precision recalculation (in this simple example, to 4 more places) resulted in an 11-bit discriminant of 10000000100, then the binary number 200 should be rounded up. If, however, the higher precision recalculation resulted in an 11-bit discriminant of 01111111101, then the binary number 200 should be rounded down.

Figure 3:
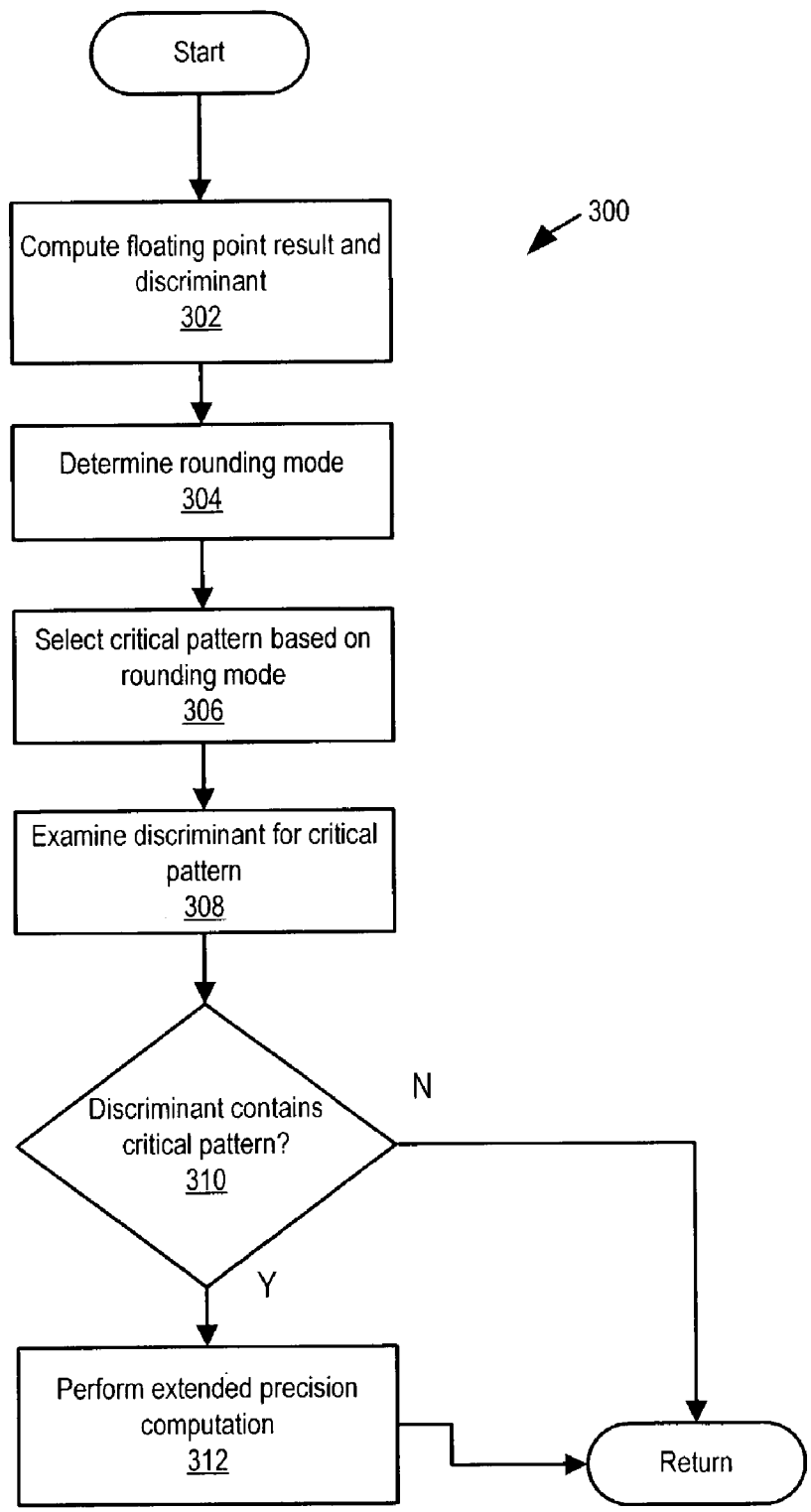
FIG. 3 is a flowchart showing steps of determining correct rounding according to embodiments of the present invention.

FIG. 3 shows a flowchart 300 that illustrates the basic operations a function can use to ensure correct rounding has occurred. The floating point result of the computation is found at 302, as well as the discriminant. The discriminant may be found naturally as a result of a processor using extra internal bits when doing calculations, or by other calculations such as a parallel or subsequent computation of the result to a higher precision.

Next, the rounding direction is determined 304. The rounding direction may have been set in status register or by use of some predefined variable. The critical pattern is then selected 306 determined based on the rounding mode. The discriminant is examined 308 to check for the critical pattern. If the critical pattern is found 310, then further computation is required 312. Note that some of the operations illustrated in FIG. 3 do not necessarily need to follow the sequence shown. For example, determining the rounding mode 304 may occur before or in parallel with calculating the floating point result 302.

Example 1 below shows how a corrected rounding function might be implemented in machine language.

| | | |
|---|---|---|
| | MOV r9 = ar.fpsr | //get the fpsr |
| | MOVI r10=0xC00 | //mask to isolate rounding direction |
| | FMA.sr.dbl f8=fb,fc, fd | //Compute double precision result (as before) |
| | FMA sr,w f9 = fb, fc, fd;; | //Compute to full 64 bits of precision |
| | AND r9=r9, r10 | //Isolate rounding direction |
| | GETF.SIG r8 = f9;; | //move result to integer register |
| | CMPI p6,p7=r9,RTN | //test for round-to-nearest |
| | ANDI r8 = r8,0x7FF | //keep lower 11 bits (discriminant) |
| (p7) | B directed | //treat directed rounding |
| | MOVI r9 = 0x400 | //prepare the critical patterns |
| | MOVI r10 = 0x3FF;; | //for round-to-nearest |
| | CMP p6, p7 = r8, r9 | //test for critical pattern 0x400 |
| (p7) | CMP p6, p7 = r8,r10 | //test for critical pattern 0x3FF |
| (p6) | B more_work | //critical discriminant |
| (p7) | BR RETURN | //non-critical discriminant-return |
| directed: | | //handle directed rounding |
| | MOVI r9, 0 | //prepare critical patterns for directed roundings |
| | MOVI r10, 0x7FF;; | |
| | CMP p6,p7 = r8, r9 | //test for critical pattern 0 |
| (p7) | CMP p6, p7 = r8,r1 0 | //test for critical pattern 0x7FF |
| (p7) | BR RETURN | //non-critical discriminant - return |
| more_work: ... | | //treat difficult to round cases here |

Copyright ® 2003 Hewlett-Packard Company

EXAMPLE 1

Note that in Example 1, the discriminant is assumed to be 11 bits wide for all precisions. This is due to the fact that the example uses double precision and double-extended precision, and double-extended precision provides 11 bits beyond what is needed for double precision. When providing procedures for other precisions, however, each precision supported by hardware may have its own built-in, fixed discriminant length. In other implementations, there may be instructions to dynamically set the discriminant length for each precision, within some limits. For example, a floating point status and control register can be used to select a discriminant length for a given precision. The critical values are then functions of the discriminant length. While this latter approach is a very flexible arrangement, it is more difficult to implement.

The situation where the extra precision computation is required is quite rare, arising only with probability of $2^{-n+1}$. Therefore, the cost of the higher precision function's use when amortized over the entire use of the function is usually less than one clock cycle per function invocation. However, the time to examine the additional n bits or digits is very time consuming, because this cost is paid on every function evaluation and the determination cannot be made until the final result is available for rounding.

Typically, a function of this sort written in assembly language may take 50 cycles to compute (for the elementary functions), and the time to determine whether the result requires additional computation may typically require about 15 cycles. Thus, function evaluation is slowed down by 30% on average due to the time needed to determine whether there may have been a misrounding, while the average cost of performing the additional calculations to determine correct rounding adds about 1–2% to the computation cost.

In some applications, such a reduction in performance may be acceptable in order to derive correct results of calculations. However, there are implementations that can make these performance reductions nominal, therefore allowing the determination of correct rounding to be more widely implemented.

Figure 4:
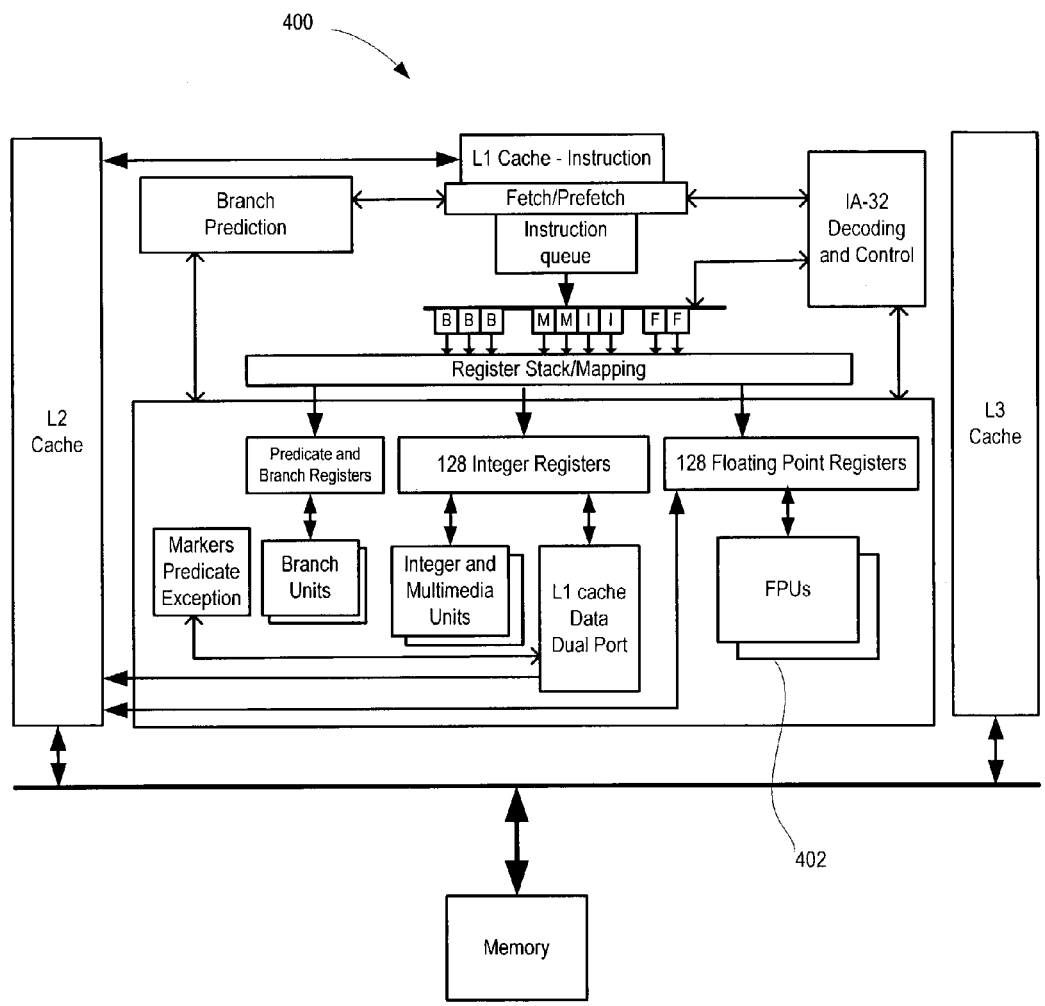
FIG. 4 is an architecture diagram showing a processor system in accordance with embodiments of the present invention.

In one aspect of the present invention, the determination of critical patterns in the discriminant can be implemented as an additional instruction to a floating point unit (FPU) instruction set. Most modern computer architectures include the FPU in the microprocessor, although the FPU can be a physically separate component from the microprocessor. An example of an integrated FPU is shown in FIG. 4, where a processor 400 includes one or more FPUs as part of the microprocessor architecture. The diagram in FIG. 4 generally conforms to a version of the Intel® Itanium® processor.

In the examples that follow, the concepts of the invention are described in relation to the Itanium architecture and its associated instruction set. It will be readily apparent to those skilled in the art that concepts of the present invention can be used in a wide variety of processor architectures, including the variants of SPARC®, PowerPC™, Alpha™, MIPS®, PA-RISC, etc. Descriptions of the Itanium processor and instruction set are provided for purposes of illustration, not of limitation.

In the Itanium, the principal floating point instruction is FMA, or fused multiply-add. Suppose that the length n of the discriminant is set to 11. The Itanium instruction could then be augmented with a new operation, critical FMA (CFMA), implemented as "(qp) CFMA pa=fb, fc, fd". The CFMA operation sets the predicate pa to true if the discriminant of a result (in "infinite precision" before rounding) is not critical. Otherwise, the predicate pa is set to false, indicating a critical pattern in the discriminant. If the controlling predicate qp is false, the instruction does not execute.

Using the CFMA operation, the routine showed in Example 1 could be replaced by the listing in Example 2 below. Note, that on a machine with two FPUs, the CFMA and FMA shown in Example 2 could execute concurrently, therefore consuming no additional time to determine whether the discriminant is critical.

|  | CFMA.sr.p p7 = fb, fc, fd | //set p7=1 iff discriminant is non-critical |
|---|---|---|
|  | FMA.sr.dbl f8=fb,fc, fd;; | //Compute and round final result |
| (p7) | BR return | //return if correctly rounded (usual case) |
|  | ... | //control reaches here if more computation //needed |

Copyright ® 2003 Hewlett-Packard Company

EXAMPLE 2

The construction of an FPU that responds to the CFMA operation is relatively simple. Since the FPU already explicitly computes at least the leading 128 bits of a result before rounding, the value of the result predicate of the CFMA is determined by comparing the discriminant with the critical values, as determined by the rounding mode in the floating point status register (fpsr). When used in conjunction with IEEE-754 floating point numbers, the discriminant is 11 bits, beginning at position 24 for single precision, 53 for double precision, or 64 for double-extended precision.

The Itanium FPU, which normally can produce 64 bit arithmetic results, has additional precision internally and can find the discriminant bits without additional computation. This is also true for architectures that can only produce double precision results such as SPARC and PowerPC.

The four critical values could be manufactured by the FPU as a consequence of setting the rounding mode in the fpsr, so that comparisons can be readily made. Note that the CFMA instruction, as described, only need produce a 1-bit predicate to show that the discriminant is not critical. Using the predicate to control the return operation leads to the smoothest implementation style. Of course, the instruction can be designed to produce the complement of this predicate; this is just a variation of the design.

By returning a single result (e.g. a predicate), the CFMA instruction can easily fit into other architectures that do not implement an FMA instruction. For architectures that do not implement an FMA instruction, there are versions of FADD, FSUB, FMPY, FDIV which could have variants CFADD, CFSUB, CFMPY, CFDIV, respectively, to indicate whether the arithmetic operation produced critical patterns in the discriminant. Other instructions could also implement a critical value variant, such as square root (FSQRT).

If returning a predicate value (e.g. a 1-bit register value) would be inconvenient to add to an existing architecture (or microarchitecture), other variations of CFMA could be devised. In one arrangement, CFMA could return a floating point result instead of a predicate. The result is designed to make it easy to distinguish whether the unrounded result is critical. Thus the floating point result might be +1.0 to indicate a critical result, and −1.0 to indicate a non-critical result. A CFMA variant utilizing a floating point return value is illustrated below in Example 3.

|  | CFMA.sr.p f7 = fb, fc, fd | //make f9=1.0 iff discriminant is critical |
|---|---|---|
|  | FMA.sr.p f8=fb,fc, fd;; | //Compute and round final result |
|  | FCMP.eq p0,p7 = f9,f1;; | //f1 contains the value +1.0 |
| (p7) | BR return | //return if correctly rounded (usual case) |
|  | ... | //control reaches here if more computation //needed |

Copyright ® 2003 Hewlett-Packard Company

EXAMPLE 3

Of course, values other than +1.0 and −1.0 could be chosen for the results of this operation. These values are chosen for illustration. Alternate variations could return 0 and a non-zero value depending on the result and still be amenable to hardware implementation.

For architectures that have a compare and branch instruction (e.g. SPARC, PA-RISC), a natural approach in implementing an instruction according to the present invention would be to define a conditional branch that is only taken depending on the existence of a critical pattern in the discriminant. For example, an instruction "CBFADD target, fa, fb" could be defined, which adds fa and fb and branching to the label "target" if the discriminant of the sum is critical for the current rounding mode. Similar CBFXXX instructions could be defined where XXX is multiplication, subtraction, or division. A CBFMA instruction could also be implemented. A variant of this type of branch instruction is to have the branch taken if the computation is non-critical. With enough opcode space, both variants could be implemented.

Another version of CFMA could return the conventionally rounded result, but cause a software assist trap if the discriminant were critical. Such an approach would require no additional code in the "main line" of a routine (other than changing the final FMA to a CFMA), but the expense of the trap would probably add another 1000 or so cycles to the cases which require further computation.

Although the estimate of 1000 cycles to handle a trapping CFMA is typical if the instruction traps to the operating system, another approach for micro-coded processors would be to have the CFMA "trap" or branch into micro-code. This approach has been taken in Itanium architecture processors for other kinds of functionality, and the overhead is much lower—only on the order of 10 cycles.

From the description provided herein, those skilled in the art are readily able to combine hardware and/or software created as described with appropriate general purpose or system and/or computer subcomponents embodying the invention, and to create a system and/or computer subcomponents for carrying out the method of the invention. The concepts of the present invention can be implemented in any combination of hardware, microcode, and higher level operating system and application software libraries.

The foregoing description of the example embodiments of the invention have been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A computer processor, comprising:
    a floating point unit arranged to perform the following steps:
        calculate a preliminary result of a floating point computation including an unrounded portion and a portion of extra precision defined as a discriminant;
        test for a critical pattern in the discriminant; and
        execute an instruction as a function of the existence of the critical pattern in the discriminant.

2. The computer processor of claim 1, further comprising a predicate register, and wherein the floating point unit is further arranged to set a bit in the predicate register as a function of the existence of the critical pattern in the discriminant.

3. The computer processor of claim 1, wherein the floating point unit is further arranged to return a floating point return value as a function of the existence of the critical pattern in the discriminant.

4. The computer processor of claim 1, wherein the floating point unit is further arranged to branch based on the existence of the critical pattern in the discriminant.

5. The computer processor of claim 1, wherein the floating point unit is further arranged to execute a microcode trap based on whether the critical pattern is found in the discriminant.

6. The computer processor of claim 1, wherein the processor is configured to execute a software assist trap based on the existence of the critical pattern in the discriminant.

7. The computer processor of claim 1, wherein the floating point computation comprises a fused add-multiply computation.

8. The computer processor of claim 1, wherein the discriminant comprises a fixed length discriminant.

9. The computer processor of claim 1, wherein the discriminant comprises a variable length discriminant.

10. The computer processor of claim 9, wherein the floating point unit is further arranged to selectably vary the length of the discriminant.

11. The computer processor of claim 10, further comprising a floating point status register, and wherein the length of the discriminant is varied based on an entry in the floating point status register.

12. The computer processor of claim 1 wherein the floating point unit arranged to perform the step to execute an instruction as a function of the existence of the critical pattern in the discriminant further comprises the floating point unit being arrange to execute instructions for recalculating a higher precision partial result if the critical pattern is found in the discriminant, and obtaining the floating point result from the higher precision partial result.

* * * * *